United States Patent
Unkefer et al.

(12) 
(10) Patent No.: US 11,800,869 B2
(45) Date of Patent: Oct. 31, 2023

(54) USE OF 6-OXO-1,4,5,6-TETRAHYDROPYRIDAZINE-3-CARBOXYLIC ACID, 1-METHYL 6-OXO-1,4,5,6-TETRAHYDROPYRIDAZINE3--CARBOXYLIC ACID AND 1-ALKYL-6-OXO-1,4,5,6-TETRAHYDRO-PYRIDAZINE-3-CARBOXYLIC ACID FOR IMPROVING GROWTH PERFORMANCE IN PLANTS

(71) Applicant: Advanced Crop Chem LLP, Marietta, GA (US)

(72) Inventors: Pat J Unkefer, Los Alamos, NM (US); Rodolfo Martinez, Santa Fe, NM (US); Nigel Grech, Fresno, CA (US); John Haywood, Howden (GB)

(73) Assignee: Advanced Crop Chem LLP, Marietta, GA (US)

( * ) Notice: Subject to any disclaimer, the term of this patent is extended or adjusted under 35 U.S.C. 154(b) by 237 days.

(21) Appl. No.: 17/112,560

(22) Filed: Dec. 4, 2020

(65) Prior Publication Data
US 2022/0174953 A1 Jun. 9, 2022

(51) Int. Cl.
*A01N 43/58* (2006.01)
*A01N 25/02* (2006.01)
*A01N 25/04* (2006.01)
*A01N 25/12* (2006.01)
*A01P 21/00* (2006.01)

(52) U.S. Cl.
CPC .............. *A01N 43/58* (2013.01); *A01N 25/02* (2013.01); *A01N 25/04* (2013.01); *A01N 25/12* (2013.01); *A01P 21/00* (2021.08)

(58) Field of Classification Search
CPC ........ A01N 43/58; A01N 25/02; A01N 25/04; A01N 25/12; A01N 25/06; A01P 21/00
See application file for complete search history.

(56) References Cited

PUBLICATIONS

Qinjie Shi, Yanxia Shi, Kang Chang, Jianqin Chen, Zhenjiang Zhao, Weiping Zhu, Yufang Xu, BaoJu Li and Xuhong Qian, "3(2H)-pyridazinone derivatives: a new scaffold for novel plant activators", RSC Advances, 2019, 9, 36204-36207. (Year: 2019).*

Juan Camilo Rueda, Andrew A. Randall, Chuck Davis, Carolina Franco, and Cherie L. Yestrebsky, "Toxicity Studies of AKGA/Hydrazines Degradation By-Products and Their Compatibility with Sewage Treatment Plant Operation", Environmental Engineering Science, 32(2), 2015, 153-162. (Year: 2015).*

* cited by examiner

*Primary Examiner* — Mina Haghighatian
*Assistant Examiner* — Nathan W Schlientz
(74) *Attorney, Agent, or Firm* — Ortiz & Lopez, PLLC; Luis M. Ortiz; Kermit D. Lopez (57) ABSTRACT

6-oxo-1,4,5,6 tetrahydropyridazine-3-carboxylic acid or its salts or 1-methyl 6-oxo-1,4,5,6-tetrahydropyridizin-3-carboxylic acid or its salts, to plants can cause an increase in parameters such as germination, seedling emergence, growth, drought tolerance and recovery, yield, *rhizobia* induced root nodulation as compared to untreated wild type plants. 1-Methyl 6-oxo-1,4,5,6 tetrahydropyridazine-3-carboxylic acid or its salts is chemically the simplest 1-alkyl 6-oxo-1,4,5,6-tetrahydropyridazine-3-carboxylic acid and as such is an example showing the effectiveness of a 1-alkyl 6-oxo-1,4,5,6 tetrahydropyridazine-3-carboxylic acid. Higher series derivatives such as 1-alkyl 6-oxo-1,4,5,6 tetrahydropyridazine-3-carboxylic acids also induce beneficial effects on treated plants.

15 Claims, 5 Drawing Sheets

USE OF 6-OXO-1,4,5,6-TETRAHYDROPYRIDAZINE-3-CARBOXYLIC ACID, 1-METHYL 6-OXO-1,4,5,6-TETRAHYDROPYRIDAZINE-3-CARBOXYLIC ACID AND 1-ALKYL-6-OXO-1,4,5,6-TETRAHYDRO-PYRIDAZINE-3-CARBOXYLIC ACID FOR IMPROVING GROWTH PERFORMANCE IN PLANTS

TECHNICAL FIELD

The present invention generally relates to improvements in agricultural and horticultural products. The present invention relates to the use acids and salts of tetrahydropyridazine (THP), in either 6-oxo-1,4,5,6 tetrahydropyridazine-3-carboxylic, 1-methyl-6-oxo-1,4,5,6-tetrahydropyridizin-3-carboxylic and 1-alkyl-6-oxo-1,4,5,6 tetrahydropyridazine-3-carboxylic, in agricultural and horticultural fields to improve plant growth performance.

BACKGROUND

Present day agricultural crop production is subjected to continuously increasing requirements for maximizing performance under normal and adverse conditions. Modern crop production requires a high level of performance beginning with uniform and rapid seed germination, uniform seedlings, uniform seedling emergence, uniform and sustained vegetative growth as well as optimizing reproductive growth and ultimately harvest. Fundamental in this process is well developed root and shoot architecture. Biotic and Abiotic factors can negatively affect plant growth such as temperature, pH, water availability, salinity, pathogens, herbivory, nutrient availability and toxicity and chemical toxicity. Abiotic stresses (such as drought, flooding, temperature, salinity, pH and nutrient availability) alter the physiology of plants resulting in decreased fitness, health, development and yields. Productively growing crop plants under marginal growth conditions (typically due to abiotic stresses) would allow for an increase in agriculture production for crop plants. Moreover, creating new vegetation is important for soil and water remediation of polluted sites created by modern industry and other human activities. Reaching a crop's genetic potential requires uninterrupted, balanced and often, intensive crop management.

These problems and challenges will impact the production of the agricultural crops grown globally. Corn, soybean, wheat and rice are grown in great quantities around the world and are considered to be among the most important crops for sustaining the human population. Millions of acres of these crops are grown under irrigation and dry land farming conditions. Continuing to maintain high yields under increasing climate variability and associated uncertainties such as water availability will require new crop management strategies and tools.

Maintaining high yields in annual crops requires many factors including germination and stand uniformity, sustained and vigorous growth leading to productive plant canopies that support high harvestable yield. Improved root growth, root architecture and root function will be needed to improve root nutritional efficiency for these plants. Optimized and appropriately developed root systems provide the foundation for increased crop biomass accumulation and ultimately, better yields. Root systems that are correctly structured and proportioned can increase drought resistance in plants. Similarly, the ability to enhance the germination of seeds in variable climatic conditions is desirable to optimize plant stand uniformity as well as crop synchrony, which allows for more efficient farming practices such as fertilization, weed management, pest and disease control as well as biological integration.

Drought is a significant contributor to global agricultural loss particularly in developing countries and is a major threat to food security. Plants that have increased tolerance to drought as well as recover more rapidly from water stress are advantageous particularly in dryland farming. Modern crop breeding technologies (conventional and transgenic) have successfully increased crop tolerance to many abiotic factors including drought, but usually with a cost of reduced crop yield and harvestable quality. Hence there is a significant unmet need to improve abiotic crop tolerance to yield robbing factors such as drought with a lesser impact on yield loss.

A significant expense in producing most crops is purchasing and applying the large amounts of fertilizer required to produce the high yields that modern agriculture demands. The demand for ammonia nitrogen fertilizer is steadily increasing. Ammonia is produced with the Haber-Bosch process, an energy intensive process that uses at least 2-3% of global energy use. Ammonia synthesis is energetically costly, but more importantly is the environmental impact of excessive Nitrogen applications to agriculture that can lead to environmental catastrophes. These costs have driven renewed interest in augmented biological nitrogen fixation. Biological nitrogen fixation is performed by specific bacteria that have and can use the enzyme, nitrogenase, to reduce inert nitrogen gas ($N_2$) from the atmosphere to a reactive nitrogen species, ammonia ($NH_3$). Ammonia can be used by plants, unlike nitrogen gas. Some crop plants form symbiotic relationships with these types of bacteria. The most familiar examples of these nitrogen fixing symbioses are found in the root nodules of legumes (peas, beans, alfalfa, clover and the like). The nodules house bacterial symbionts such as members of the Sinorhizobia or Bradyrhizobia. Additionally, nitrogen fixing bacteria that do not form nodules are found that inhabit many diverse ecosystems inside and on plant surfaces as well as in soil and aquatic environments. Increasing nitrogen use efficiency can also increases atmospheric carbon uptake by plants. Soybeans are examples of legumes that release significant amounts of $NH_3$ into the soil. This excess ammonia is available for the next crop planted in that field; usually this occurs the next year which can provide a significant cost advantage to farmers.

Most major crops are either monocotyledons or dicotyledons. Monocotyledon are seed plants that produce an embryo with a single cotyledon, an embryonic leaf, and parallel-veined leaves. They are often called monocots. They include grasses which include the common grain crops corn, wheat, rice, barley and oats and sugar cane and banana. Dicotyledon are seed plants that produce an embryo with two cotyledons and net-veined leaves. They are often called dicots. Many of our crop plants are dicots including cotton, legumes, such as soybeans and alfalfa, potatoes, sugar beets and vegetable crops. Technologies are needed that benefit a broad spectrum of crops; consequently, ones that benefit monocots and dicots are valuable. We have demonstrated these technologies on two monocots, wheat and corn and on two dicots, soybean and peppers.

SUMMARY

It is an object of the present invention to enhance the phenotypical properties of plants, including, inter alia, seedling emergence, plant root and foliar growth, plant growth rate, nutritional use efficiency, abiotic stress resistance including temperature and water stress resistance), symbiotic microbia associations and concomitant nutrient use efficiency (NUE), carbon sequestration, and harvestable yield, by applying tetrahydropyridazine (THP), which is an organic compound, in any of 6-oxo-1,4,5,6 tetrahydropyridazine-3-carboxylic acid, 1-methyl 6-oxo-1,4,5,6 tetrahydropyridazine-3-carboxylic acid or 1-alkyl-6-oxo-1,4,5,6 tetrahydropyridazine-3-carboxylic acid, or their respective salts, to plants in order to positively affect these properties in what then becomes "treated" plants.

Additional objects, advantages and novel features of the invention will be set forth, in part, in the description that follows, and, in part, will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects of the present invention, and in accordance with its purposes, as embodied and broadly described herein, the method for increasing the rate of growth of plants and for improving other properties of growing plants hereof includes contacting a plant (e.g., "treating plants") with an effective amount of tetrahydropyridazine (THP), embodied in at least one of 6-oxo-1,4,5,6-tetrahydropyridizin-3-carboxylic acid or salt, 1-methyl 6-oxo-1,4,5,6-tetrahydropyridazine-3-carboxylic acid or salt, or 1-alkyl-6-oxo-1,4,5,6 tetrahydropyridazine-3-carboxylic acid or salt, and improving plant growth performance in the treated plants.

Preferably, a solution of 6-oxo-1,4,5,6 tetrahydropyridazine-3-carboxylic acid or 1-methyl 6-oxo-1,4,5,6 tetrahydropyridazine-3-carboxylic acid or 1-alkyl-6-oxo-1,4,5,6 tetrahydropyridazine-3-carboxylic acid is applied to a seed surface, root system or the foliar portion of the plant. Benefits and advantages of the present invention include significant improvement in treated plant properties, such as, biomass accumulated in roots and foliage, overall yield in field grown crops, seedling emergence and drought resistance with a simple and efficient treatment regimen.

6-oxo-1,4,5,6 tetrahydropyridazine-3-carboxylic acid and 1-methyl 6-oxo-1,4,5,6 tetrahydropyridazine-3-carboxylic acid are very similar in structure and provide similar plant responses when they are used to treat seeds or plants. For reasons of structural similarity, it is also reasonable to expect 1-alkyl substituted 6-oxo-1,4,5,6 tetrahydropyridazine-3-carboxylic acid to provide similar plant responses when they are used to treat seeds or plants. The carboxyl groups of 6-oxo-1,4,5,6 tetrahydropyridazine-3-carboxylic acid and 1-alkyl-6-oxo-1,4,5,6 tetrahydropyridazine-3-carboxylic acid also allow the formation of an ester. Based on their chemical similarity with the 6-oxo-1,4,5,6 tetrahydropyridazine-3-carboxylic acid and 1-methly 6-oxo-1,4,5,6-tetrahydropyridizin-3-carboxylic acid these esters can be expected to be effective as well on treated plants.

It is a feature of the present invention to apply tetrahydropyridazine (THP) to plants to enable an increase in performance of the treated plant over that of untreated plants by increasing weight and biomass of the foliar parts the treated plant over that for untreated plants.

It is also a feature of the present invention to apply tetrahydropyridazine (THP) to plants to enable an increase in performance of the treated plant over that of untreated plants by increasing weight or biomass of the roots of the treated plant over that for untreated plants.

It is also a feature of the present invention to apply tetrahydropyridazine (THP) to plants to enable an increase in performance of the treated plant over that of untreated plants by increasing seedling emergence of the treated plant over that for untreated plants.

It is also a feature of the present invention to apply tetrahydropyridazine (THP) to plants to enable an increase in performance of the treated plant over that of untreated plants by increasing yield of the treated plant over that for untreated plants.

It is also a feature of the present invention to apply tetrahydropyridazine (THP) to plants to enable an increase in performance of the treated plant over that of untreated plants by increasing agronomic performance of monocotyledonous and dicotyledonous in treated plants over that for untreated plants.

It is also a feature of the present invention to apply tetrahydropyridazine (THP) to plants to enable an increase in performance of the treated plant over that of untreated plants by increasing drought resistance of treated plants over that for untreated plants.

It is also a feature of the present invention to apply tetrahydropyridazine (THP) to plants to enable an increase in performance of the treated plant over that of untreated plants by increasing drought recovery of treated plants over that for untreated plants.

It is also a feature of the present invention to apply tetrahydropyridazine (THP) to plants to enable an increase in performance of the treated plant over that of untreated plants by increasing germination and seedling emergence rate of treated plants in cool and warm germination temperatures over that for untreated plants.

It is also a feature of the present invention to apply tetrahydropyridazine (THP) to plants to enable an increase in performance of the treated plant over that of untreated plants by increasing root nodulation with a nitrogen fixing bacterium in treated plants.

BRIEF DESCRIPTION OF THE DRAWINGS

The accompanying drawings, which are incorporated in and form a part of the specification, present the chemical structures of the active compounds that can be applied to plants. They also illustrate the embodiments of the present invention and, along with the description, serve to explain the principles of the invention. In the drawings.

DETAILED DESCRIPTION

Briefly, the present invention includes the application of tetrahydropyridazine (THP), which is an organic compound, in any of 6-oxo-1,4,5,6-tetrahydropyridazine-3-carboxylic acid, 1-methyl 6-oxo-1,4,5,6-tetrahydropyridazine-3-carboxylic acid or 1-alkyl-6-oxo-1,4,5,6-tetrahydropyridazine-3-carboxylic acid, or their salts, to plants (seeds, foliage, roots) to improve plant growth and other properties for plants that are so treated. 6-oxo-1,4,5,6 tetrahydropyridazine-3-carboxylic acid and 1-methyl-6-oxo-1,4,5,6 tetrahydropyridazine-3-carboxylic acid are sold commercially for use as reactants in commercial chemical syntheses. No other uses were found for these compounds. These compounds are the products of chemical synthesis and they are readily biodegraded by environmental microorganisms.

Figure 1:
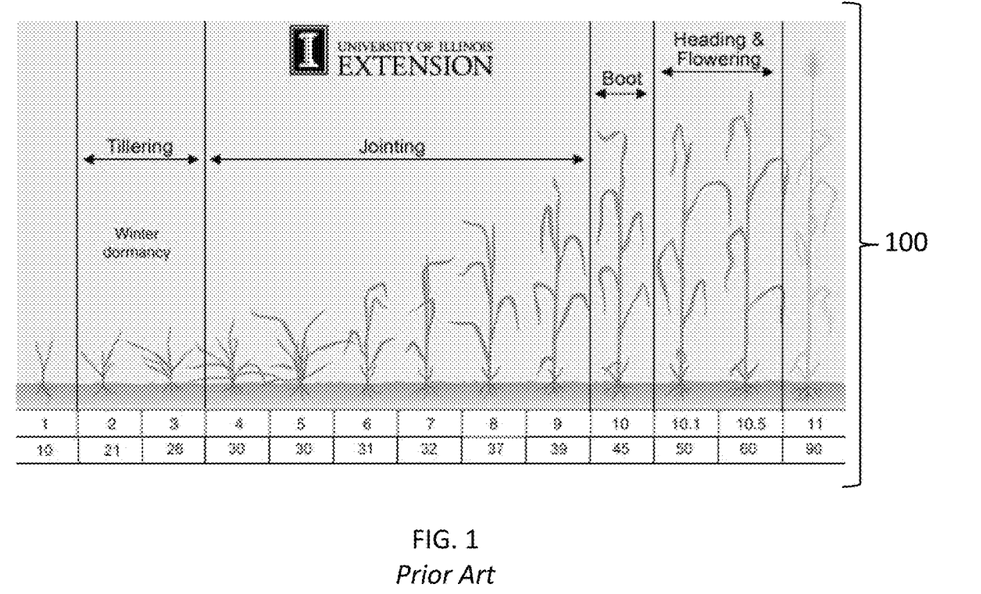
FIG. 1. labeled as prior art, illustrates a phenology diagram of the growth stages of wheat published by the University of Illinois.

Referring to FIG. 1, illustrated is a phenology diagram 100 of wheat growth stages published by the University of Illinois. Although it does not teach embodiments of the present invention, it is useful as a reference for the application timings of 6-oxo-1,4,5,6 tetrahydropyridazine-3-carboxylic acid and 1-methyl 6-oxo-1,4,5,6 tetrahydropyridazine-3-carboxylic acid described herein for the treatment of plants as further elaborated on in the examples. The growth stages of wheat as shown here are related to the two most commonly used methods of describing them (see Zadoks, JC, Chang TT, Konizak CF 1974, A decimal code for the growth stages of cereals. Weed Research 14(6): 415-421). Growth stages for a Feekes method are shown in the first row of diagram, while growth stages for a Zadoks method are shown in the second row of the diagram. Displayed on the X-axis are the Feekes method, which is given in the top row, and the Zadoks method, which is given in the bottom row.

Figure 2:
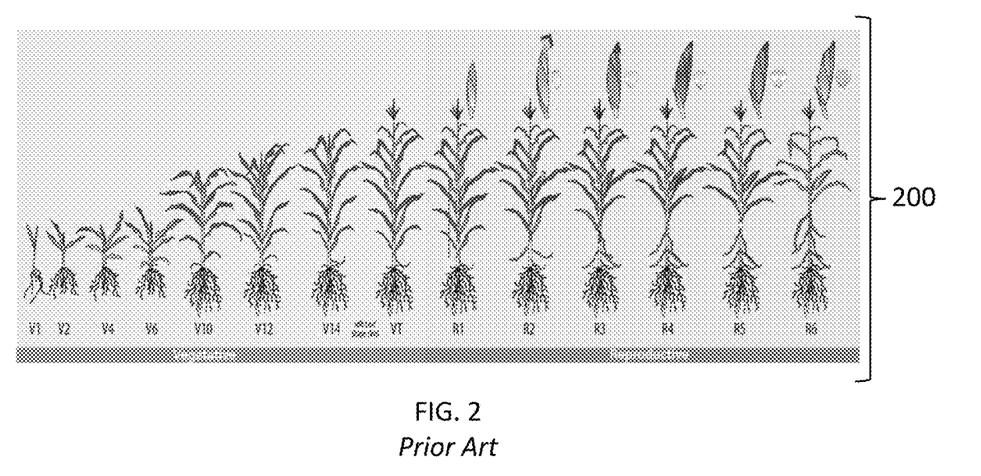
FIG. 2. illustrates a phenology diagram of the growth stages of Maize.

Referring to FIG. 2, illustrated is a phenology diagram 200 of the growth stages of Maize. It is also useful as a reference to the application timings of 6-oxo-1,4,5,6-tetrahydropyridazine-3-carboxylic acid and 1-methyl 6-oxo-1,4,5,6-tetrahydropyridazine-3-carboxylic acid, which is further described in the examples that follow.

Figure 3:
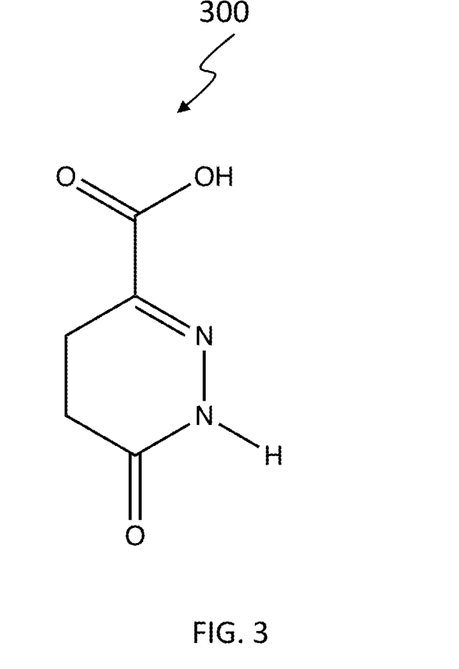
FIGS. 3-4 illustrate structures of 6-oxo-1,4,5,6 tetrahydropyridazine-3-carboxylic acid, 1-methyl and 6-oxo-1,4,5,6 tetrahydropyridazine-3-carboxylic acid, respectively.
Figure 4:
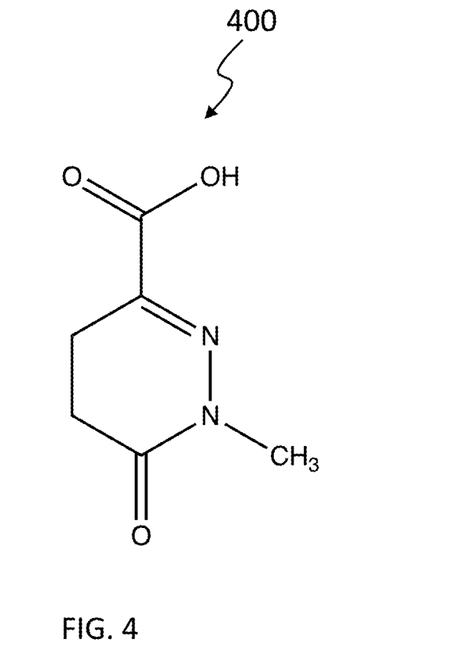

Referring to FIG. 3, illustrated is the structure 300 of 6-oxo-1,4,5,6-tetrahydropyridazine-3-carboxylic acid, and referring to FIG. 4 illustrated is the structure of 1-methyl and 6-oxo-1,4,5,6 tetrahydropyridazine-3-carboxylic acid.

Figure 5:
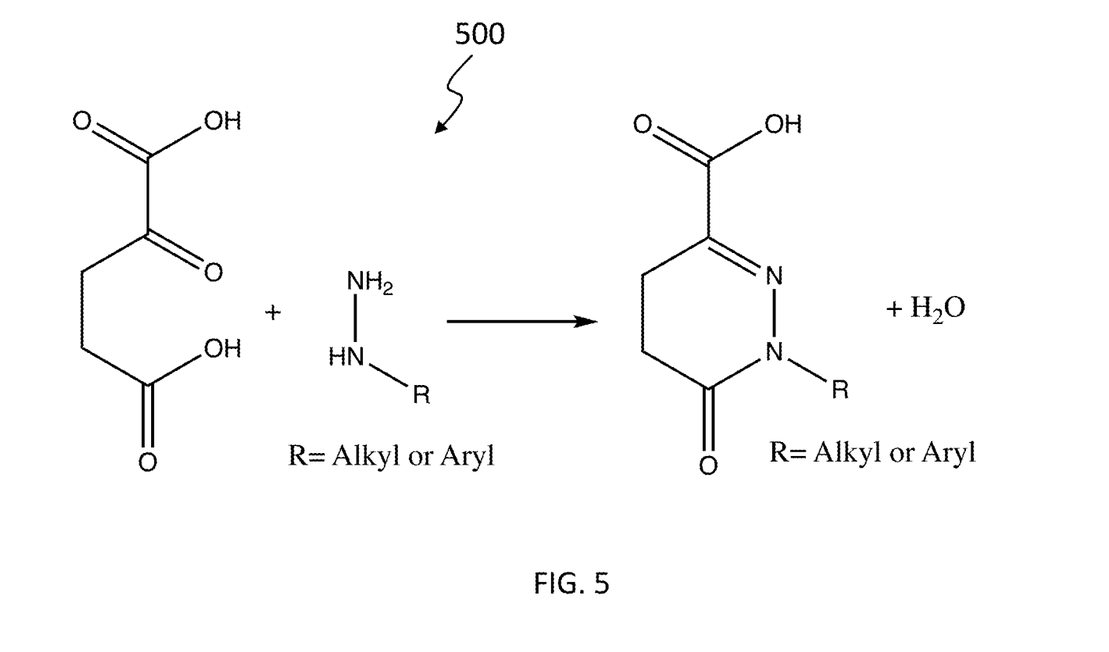
FIG. 5 illustrates a schematic synthesis route description for higher series derivatives of 6-oxo-1,4,5,6 tetrahydropyridazine-3-carboxylic acid.

Referring to FIG. 5, illustrated is a schematic synthesis route description 500 for higher series derivatives of 6-oxo-1,4,5,6 tetrahydropyridazine-3-carboxylic acid.

Figure 6:
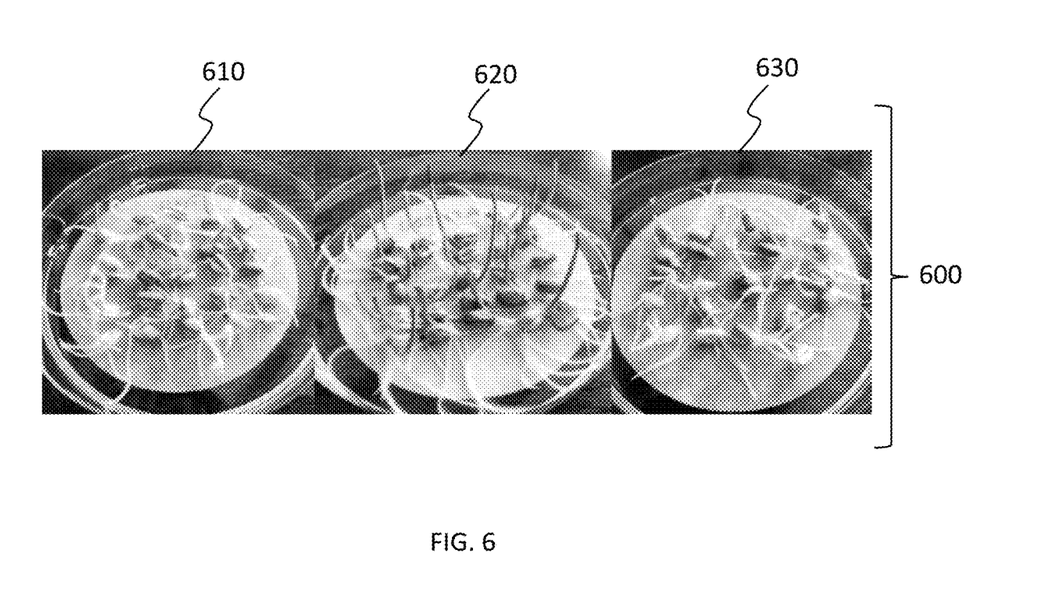
FIG. 6 illustrates photographs of an In vitro assessment of the effects on the germination and early stage growth of wheat following treatment of naked wheat seed with of 6-oxo-1,4,5,6 tetrahydropyridazine-3-carboxylic acid.

Referring to FIG. 6, illustrated are three photographs 600 of an In vitro assessment of the effects on the germination and early stage growth of wheat following treatment of naked wheat seed with of 6-oxo-1,4,5,6 tetrahydropyridazine-3-carboxylic acid. Untreated 610, THP 620 and a commercial seed treatment, Take Off® 630. The seed shown in 620 was grown under natural daylight conditions at 20-22 degrees Centigrade.

Figure 7:
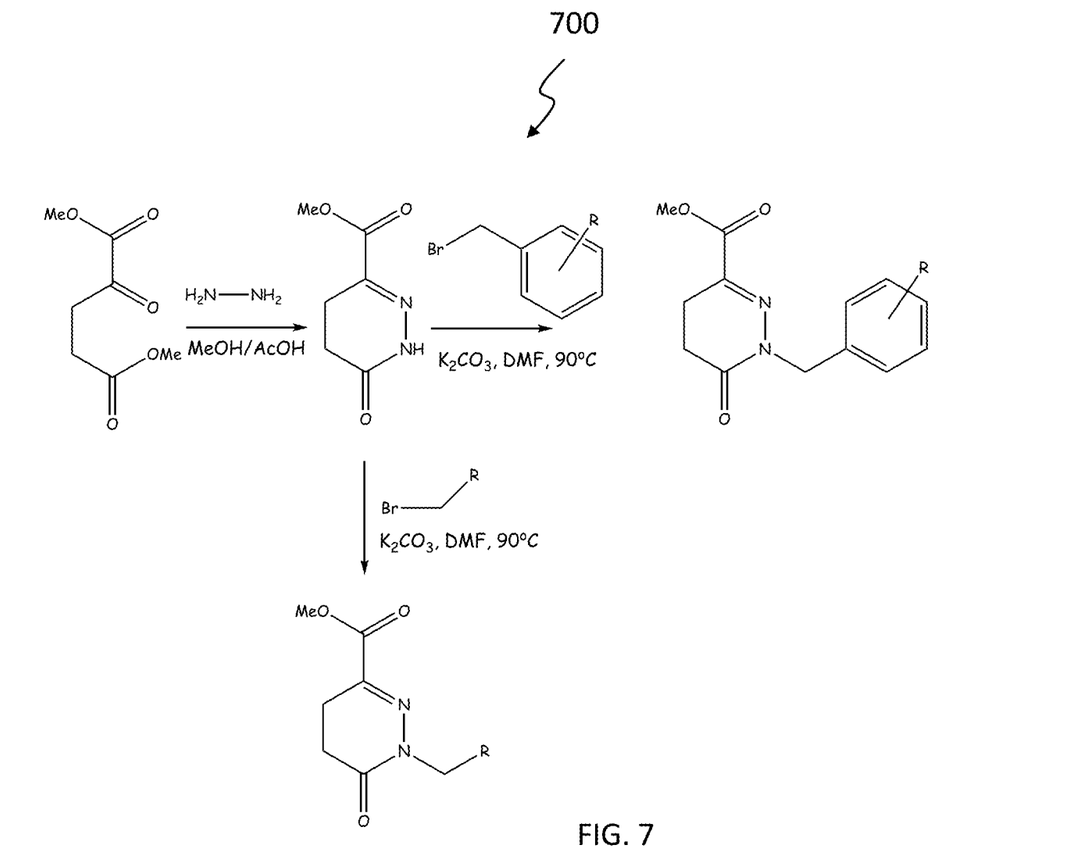
Referring to FIG. 7, illustrated is a schematic synthesis for production of alkyl THP's and their associated esters.

Referring to FIG. 7, illustrated is a schematic synthesis 700 for production of alkyl THP's and their associated ester. Starting with dialkyl-2-oxopentanedioate the methyl-6-oxo-1,4,5,6 tetrahydropyridazine-3-carboxylate (THP) can be produced by reaction with hydrazine in the appropriate alcohol and acetic acid. The reaction of THP with alkyl bromides or alkyl iodides in dimethyl formamide produces alkyl THP's in an 80% yield over 2 steps. FIG. 7 shows the synthesis of starting from the dimethyl-2-oxopentanedioate to give alkyl 1-methyl-6-oxo-1,4,5,6 tetrahydropyridazine-3-carboxylates.

Figure 8:
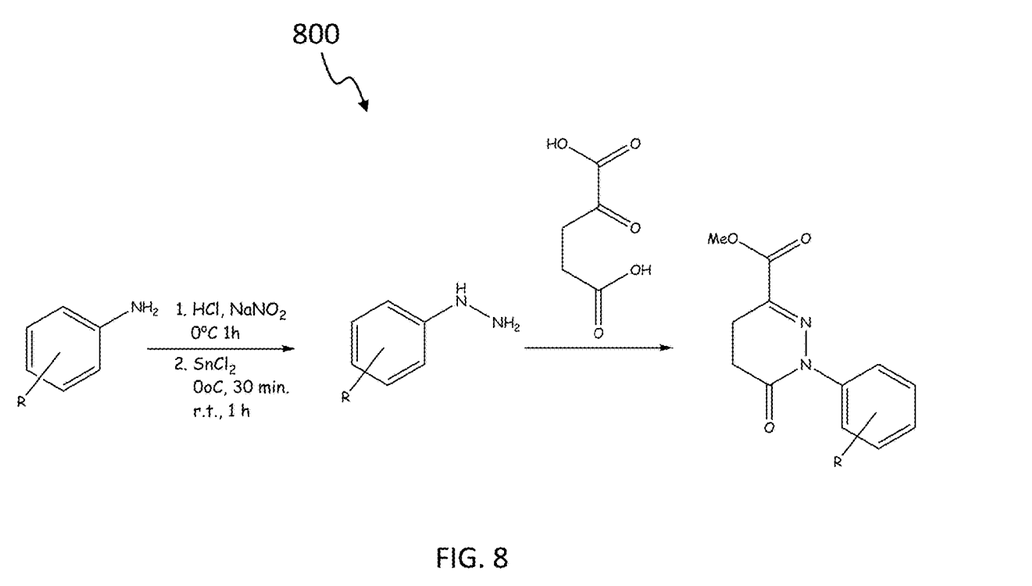
Referring to FIG. 8, illustrated is a schematic synthesis for production of alkyl THP's and their associated esters.

Referring to FIG. 8, illustrated is a schematic synthesis 800 for production of aryl THP's and their associated esters. arylhydrazines can be produced by treatment of substituted anilines with sodium nitrite followed by reduction with tin chloride. The arylhydrazines can then be treated with 2-oxopentanedioic acid or esters to produce the aryl THP's as shown in FIG. 8.

Figure 9:
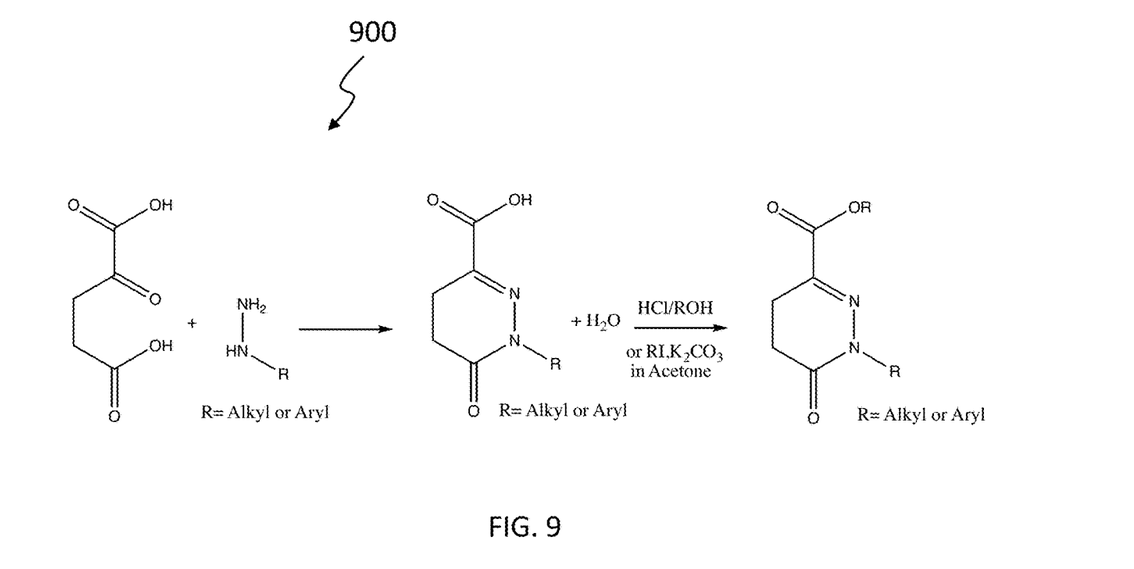
Referring to FIG. 9, illustrated is a schematic synthesis for producing additional derivatives of 6-oxo-1,4,5,6 tetrahydropyridazine-3-carboxylic acid and 1-methyl-6-oxo-1,4,5,6 tetrahydropyridazine-3-carboxylic acid.

Use of 6-oxo-1,4,5,6 tetrahydropyridazine-3-carboxylic acid, 1-methyl 6-oxo-1,4,5,6 tetrahydropyridazine-3-carboxylic acid and 1-alkyl-6-oxo-1,4,5, tetrahydropyridizine-3-carboxylic acids for improving performance of plants. 6-oxo-1,4,5,6 tetrahydropyridazine-3-carboxylic acid and 1-methyl-6-oxo-1,4,5,6-tetrahydropyridizin-3-carboxylic acid in the examples described in this document can be produced from the reaction of 2-ketoglutaric acid with hydrazine or monomethyl hydrazine. Referring to FIG. 9, a method 900 is illustrated for producing additional derivatives of 6-oxo-1,4,5,6 tetrahydropyridazine-3-carboxylic acid and 1-methyl-6-oxo-1,4,5,6 tetrahydropyridazine-3-carboxylic acid.

Reference will now be made in detail to the preferred embodiments of the present invention. It will be shown that when seeds or plants are treated with THP, such as 6-oxo-1,4,5,6 tetrahydropyridazine-3-carboxylic acid and/or 1-methyl 6-oxo-1,4,5,6-tetrahydropyridazine-3-carboxylic acid, the seedlings and growing plants outperform those from untreated seeds or plants. Alternatively, plants may be treated by application of a solution or solid or suspension of 6-oxo-1,4,5,6 tetrahydropyridazine-3-carboxylic acid or 1-methyl 6-oxo-1,4,5,6 tetrahydropyridazine-3-carboxylic acid to the foliar or below ground portions thereof. Alternatively, the growing media in which the plants are growing could be treated with a solution or solid or suspension of 6-oxo-1,4,5,6-tetrahydropyridazine-3-carboxylic acid or 1-methyl 6-oxo-1,4,5,6-tetrahydropyridazine-3-carboxylic acid.

6-oxo-1,4,5,6 tetrahydropyridazine-3-carboxylic acid and 1-methyl 6-oxo-1,4,5,6 tetrahydropyridazine-3-carboxylic acid can be degraded by commonly occurring microbes into harmless derivatives, and as such their use is expected to be environmentally sound.

Wheat, corn, soybeans and peppers were chosen as representatives of monocotyledons and dicotyledons, respectively, the major groups of crop plants, and were treated with 6-oxo-1,4,5,6 tetrahydropyridazine-3-carboxylic acid and 1-methyl 6-oxo-1,4,5,6 tetrahydropyridazine-3-carboxylic acid. Germination, seedling emergence, root and shoot biomass accumulation, and yield were monitored.

In the practice of the present invention, plants were treated to initiate the beneficial responses. Seeds, root systems or foliar parts can be treated. Multiple treatments during the growing season can be used. The concentrations of 6-oxo-1,4,5,6-tetrahydropyridazine-3-carboxylic acid and/or 1-methyl-6-oxo-1,4,5,6-tetrahydropyridazine-3-carboxylic acid are set forth in the examples herein below.

Turning Now to the Examples

Example 1

Wheat seeds were treated with 6-oxo-1,4,5,6 tetrahydropyridazine-3-carboxylic acid (THP) and treated plants to examine the impact on shoot and root biomass.

Winter wheat variety AWC 13 seeds were treated with either 6-oxo-1,4,5,6-tetrahydropyridazine-3-carboxylic acid (THP) or 1-methyl 6-oxo-1,4,5,6 tetrahydropyridazine-3-carboxylic acid (MTHP) at an effective rate of 10g diluted in 2 L water plus 0.25% Nouryon wetter and applied to 1 ton of seed. These seed were planted in coarse river sand and grown in a greenhouse under ambient light at the greenhouse at 21° C. Plants were irrigated every other day with water containing 50% strength Hoaglands solution. Plants were assessed for emergence and biomass accumulation 30 days after planting. The plants from seeds treated with 6-oxo-1,4,5,6-tetrahydropyridizin-3-carboxylic acid or 1-methyl 6-oxo-1,4,5,6 tetrahydropyridazine-3-carboxylic acid had larger root biomasses (0.83, 0.85 g, dry weight/plant) compared with plants from untreated seeds (0.65 g dry weight/plant).

Example 2

Wheat, corn and pepper seeds were treated with 6-oxo-1,4,5,6-tetrahydropyridizine-3-carboxylic acid (THP) using the same methodology and growth conditions as described in example 1 and the resulting plants were also treated with a light foliar cover spray using an electric hand-held sprayer. (100 g in 200 L water plus 0.25% Nouryon wetter) of 6-oxo-1,4,5,6 tetrahydropyridazine-3-carboxylic acid (30 days post emergence (wheat at Zadoks GS 14 (see FIG. 1), maize at V2, Pepper at 3-4 leaf stage) and then assessed for root and shoot biomass 45 days later. At 75 days post planting the plants were assessed for root and shoot biomass as measured with dry weight.

TABLE 1

| | % Difference vs Untreated | | |
| --- | --- | --- | --- |
| | Wheat | Corn | Pepper |
| Root Dry Weight | 12 | 8 | 19 |
| Shoot Dry Weight | 7 | 3 | 9 |
| Emergence[x] | 16 | 11 | 24 |

[x] = % Emergence at 10 days post planting

Seed treatment with THP increased emergence. The seed treatment plus a foliar application of THP both shoot and root biomass compared to the untreated cohort groups.

Example 3

Greenhouse grown wheat plants were given foliar treatment (using the same methodology and dosages as example 2) of 6-oxo-1,4,5,6 tetrahydropyridazine-3-carboxylic acid (THP) or 1-methyl 6-oxo-1,4,5,6-tetrahydropyridazine-3-carboxylic acid (MTHP) and their shoot biomass was determined. Plants were treated at Zadoks GS 20 (see FIG. 1). The plants were grown in coarse river sand in, 4 inch pots (10 plants per pot, 10 pots per treatment.) in a greenhouse and irrigated daily. They were provided 0.5 g/4" pot of Osmaocte, a time-release complete nutrient mix per pot. There were 10 replicated per treatment.

Example 4

Greenhouse grown wheat plants (Variety Skyfall) were given foliar treatment of 1-methyl 6-oxo-1,4,5,6 tetrahydropyridazine-3-carboxylic acid (MTHP) or 6-oxo-1,4,5,6 tetrahydropyridazine-3-carboxylic acid (THP), utilizing the same methodology as in example 2. Foliar and root biomass were determined 30 days later at Zadocks growth stage 22-24.

| | Dry Weight | | | |
| --- | --- | --- | --- | --- |
| Treatment | Root (g) | | Shoot (g) | |
| Con | 1.03 | a | 0.55 | a |
| THP | 1.45 | b | 0.74 | b |
| MTHP | 1.64 | b | 0.7 | B |

P = 0.05 Duncan Waller T-Test

Example 5

Wheat plants (Variety AWC 13) were given a foliar treatment of 6-oxo-1,4,5,6-tetrahydropyridazine-3-carboxylic acid(THP) or 1-methyl 6-oxo-1,4,5,6 tetrahydropyridazine-3-carboxylic acid (MTHP) and their foliar and root dry biomass determined 30 days after application. The foliar applications were applied at approximately at Zadoks GS 15-20 (see FIG. 1) and assessed 30 days later at Zadoks GS 22-24 (also shown in FIG. 1).

| | Dry Weight | | | |
| --- | --- | --- | --- | --- |
| Treatment | Root | | Shoot | |
| Con | 0.65 | a | 0.47 | a |
| THP | 1.5 | b | 1.01 | b |
| MTHP | 2.06 | b | 0.98 | b |

Each value is the mean of 10 plants
P = 0.05 Duncan Waller T-Test

Example 6

Field grown wheat plants (Var: AWC 13) were given foliar treatment at Zadoks GS 25-26 (FIG. 1) of 6-oxo-1,4,5,6 tetrahydropyridazine-3-carboxylic acid (THP) or 1-methyl 6-oxo-1,4,5,6 tetrahydropyridazine-3-carboxylic acid (MTHP) both at 100 g in 200 L water plus 0.25% Nouryon wetter. Plants were grown under standard UK wheat growing cultural practice (https://andb.org.uk/wheatgg). Yield was assessed at harvest.

| | Dry Weight | | | |
| --- | --- | --- | --- | --- |
| Treatment | Root | | Shoot | |
| Con | 0.65 | a | 0.47 | a |
| THP | 1.5 | b | 1.01 | b |
| MTHP | 2.06 | b | 0.98 | b |

Each value is the mean of 10 plants
P = 0.05 Duncan Waller T-Test

Example 7

Wheat seeds were treated with 1-methyl 6-oxo-1,4,5,6 tetrahydropyridazine-3-carboxylic acid treated plants to examine the impact on root biomass for field grown plants. Wheat seeds were treated with 1-methyl 6-oxo-1,4,5,6 tetrahydropyridazine-3-carboxylic acid and field grown. The plants from seeds treated with 1-methyl 6-oxo-1,4,5,6 tetrahydropyridazine-3-carboxylic acid had larger root biomass (0.84 g dry weight/plant) compared with plants from untreated seeds (0.66 g dry weight/plant).

Example 8

Corn and wheat plants were given a foliar treatment Zadoks 15-20 (FIG. 1) and V1 respectively (as described in Example 2) with 6-oxo-1,4,5,6 tetrahydropyridazine-3-carboxylic acid (THP) and then assessed for root and shoot biomass. Three treatment dosages were applied (Table 2). Plants were grown in a greenhouse with a diurnal cycle of 55-75F with ambient light. The plants were grown in a coarse river sand in 4" pots with 0.5 g of Osmacote/pot. The mean root and shoot fresh weights were assessed at 35 days post treatment.

TABLE 2

| Plant | | Dose, g/ha delivered in the equivalent of 200 L/ha | | | |
|---|---|---|---|---|---|
| | | 0 | 50 | 100 | 200 |
| Corn | Shoot, FWt, g | 6.1 | 7.8 | 7.2 | 5.1 |
| | Root, FWt, g | 2.3 | 2.7 | 3.4 | 1.8 |
| Wheat | Shoot, FWt, g | 3.2 | 4.4 | 5.2 | 5.8 |
| | Root, FWt, g | 1.8 | 2.1 | 1.9 | 2.7 |

Example 9

Wheat seeds were treated with 6-oxo-1,4,5,6 tetrahydropyridazine-3-carboxylic acid and the shoot and root fresh weights as shown in Table 1. Shoot and root fresh weights at this stage are components of early seedling emergence which is important for early establishment of a vigorous and productive crop.

Wheat seeds were treated with a solution of either 0.1 mM or 0.01 mM 6-oxo-1,4,5,6 tetrahydropyridazine-3-carboxylic acid in an aqueous solution at pH 5.7-5.8. The seeds were placed on moist germination paper and allowed to germinate at 75-85° F. The control seeds were imbibed in aqueous solution containing only the soft soap and glycerol.

TABLE 3

| Tissue | Control | 0.1 mM 6-oxo-1,4,5,6-tetrahydropyridazine-3-carboxylic acid | 0.01 mM 6-oxo-1,4,5,6-tetrahydropyridazine-3-carboxylic acid |
|---|---|---|---|
| Shoot, mg | 27.4 | 42.1 | 44.7 |
| Roots, mg | 29.1 | 43.8 | 48.1 |

Example 10

Soybean seeds were treated with 6-oxo-1,4,5,6 tetrahydropyridazine-3-carboxylic acid and the weights of the shoots were determined as shown in Table 2. Early seedling emergence is important for early establishment of a vigorous and productive crop.

Soybean seeds (Var. Viking) were treated by imbibing them for three minutes with a solution of 0.01 mM 6-oxo-1,4,5,6-tetrahydropyridazine-3-carboxylic acid in an aqueous solution also containing soft soap and glycerol at pH 5.7-5.8. The control seeds were imbibed in aqueous solution containing only the soft soap and glycerol at pH 5.7-5.8. The seeds were placed on moist germination paper and allowed to germinate at 75-85° F. The fresh weights were taken to assess the shoot development.

TABLE 2

| Tissue | Control | 0.01 mM 6-oxo-1,4,5,6-tetrahydropyridazine-3-carboxylic acid |
|---|---|---|
| Shoots, Fresh wt. mg | 98.3 | 114.3 |
| Shoots, Fresh Wt. mg | 106.2 | 128.6 |

Example 11

Wheat seeds were treated with 6-oxo-1,4,5,6 tetrahydropyridazine-3-carboxylic acid or a commercial seed treatment at labeled rates (Take Off ST) and allowed to germinate to examine and compare the effects of temperature on germination.

Wheat seeds were treated with 6-oxo-1,4,5,6 tetrahydropyridazine-3-carboxylic acid or Take Off, a commercial biostimulant (that claims faster germination and emergence). The treated seeds received the treatment compounds at the rate of 10 g per ton of seed utilizing the same dosing methodology as Example 1. However in this case seeds were germinated on moistened absorbent paper towel discs in closed petri dishes. The seeds were incubated at 20C in darkness until germination commenced and then grown in natural diurnal conditions for a further 12 days. As shown in FIG. 6 seeds treated with 6-oxo-1,4,5,6 tetrahydropyridazine-3-carboxylic acid generated greater root biomass and longer bright green shoots than the plants from either untreated seeds or Take Off treated seeds.

Example 12

Nine field grown wheat plots (20 m$^2$) were established. In each plot, the area was split into two and one half treated with 6-oxo-1,4,5,6 tetrahydropyridazine-3-carboxylic acid (THP) to assess for effects on yield. Plants were treated at Zadocks GS 30 as described in example 6 under standard cultural practices. The average yield response compared to the untreated plants across all sites was 0.596 tons per hectare.

TABLE 3

| Treatment | Yield as Percent Increase over Untreated | | | | | | | | |
|---|---|---|---|---|---|---|---|---|---|
| | Field 1 | Field 2 | Field 3 | Field 4 | Field 5 | Field 6 | Field 7 | Field 8 | Field 9 |
| 6-oxo-1,4,5,6-tetra-hydro-pyridazine-3-carboxylic acid | 6.25* | 8.7* | −0.3 | 13.9* | 3.0 | 3.3 | 6.5 | 9.8* | 8.1* |

*Significant at P = 0.1 Duncan Walller T-test.

Example 13

Wheat seedlings were given foliar treatments with a range of concentrations of 6-oxo-1,4,5,6 tetrahydropyridazine-3-carboxylic acid and the seedlings were grown and the numbers of tillers each plant produced was monitored as shown in Table 4. The number of tillers is considered positively related to grain yield.

Sets of wheat seedlings (Var. VitPro) were given foliar treatments of 6-oxo-1,4,5,6 tetrahydropyridazine-3-carboxylic acid at concentrations of 0.1 mM, 0.01 mM or 0.001 mM *in a standard nutrient solution. Seedlings were given one foliar treatment at Zadoks GS 12 (FIG. 1); the plants grown in a greenhouse and fed a standard plant nutrient solution. The untreated control plants were sprayed with the nutrient solution containing sodium dodecyl sulfate, 0.1% and glycerol 1.2%. The number of tillers for each plant were counted at Zadoks GS 15 (FIG. 1) and the average number of tillers per plant calculated.

TABLE 4

| Plant Parameter Tracked | 6-oxo-1,4,5,6-tetrahydropyridazine-3-carboxylic acid concentration in treatment solutions | | | |
|---|---|---|---|---|
| | 0 | 0.1 mM | 0.01 mM | 0.001 mM |
| Tillers per plant, average | 3.7 | 7.4 | 9.5 | 4.1 |

Example 14

Wheat seeds were treated with 6-oxo-1,4,5,6 tetrahydropyridizine-3-carboxylic acid treated plants to examine the impact on shoot and root biomass for field grown plants.

Winter wheat variety AWC 13 seeds were treated with 6-oxo-1,4,5,6-tetrahydropyridazine-3-carboxylic acid and field grown. The plants from seeds treated with 6-oxo-1,4,5,6 tetrahydropyridazine-3-carboxylic acid had larger root biomass (0.85 g dry weight/plant) compared with plants from untreated seeds (0.66 g dry weight/plant).

Example 15

Wheat seeds were treated with 6-oxo-1,4,5,6-tetrahydropyridizin-3-carboxylic acid at two different temperature regimes to investigate the affect on germination. Soil temperature impacts the percentage of seeds germinating and how fast seedlings emerge from the soil. Each of these parameters influences how well the plants develop and ultimately crop yield.

Wheat seeds were treated with 6-oxo-1,4,5,6 tetrahydropyridazine-3-carboxylic acid at two different temperature regimes to investigate the affect on germination. Soil temperature impacts the percentage of seeds germinating and how fast seedlings emerge from the soil. Each of these parameters influences how well the plants develop and ultimately crop yield.

Wheat seeds were treated with 6-oxo-1,4,5,6 tetrahydropyridazine-3-carboxylic acid (THP) at a rate of 10 g/ton of seeds in accordance with the methodology of example 1. Seeds were planted in 12"×12" germination trays in a 1" grid, 100 seeds per tray. Growth media was coarse river sand. Additionally, each cell in the grid received one granule of Osmocote approximately above where the seed was planted. Trays were irrigated every day. The seeds were then allowed to germinate at controlled environment chambers at either 10C (50F) or 20C (68 F) to examine the effects at different temperatures. The number of seedlings emerged was tracked daily.

TABLE 5

| | | % Emergence Days after planting | | | | | | |
|---|---|---|---|---|---|---|---|---|
| | | 5 | 6 | 7 | 8 | 9 | 10 | 11 |
| 10 C. | Untreated | 0 | 0 | 0 | 4 | 14 | 38 | 45 |
| | Treated | 0 | 0 | 11 | 19 | 27 | 60 | 68 |
| 20 C. | Untreated | 11 | 28 | 54 | 72 | 97 | 97 | 97 |
| | Treated | 14 | 48 | 80 | 100 | 100 | 100 | 100 |

Example 16

Wheat seeds were treated with 6-oxo-1,4,5,6 tetrahydropyridazine-3-carboxylic and leaf wilting was tracked to examine the resistance to drought in the seedlings as shown in Table 6.

Wheat seeds (Var. VitPro) were treated with an aqueous solution of either 0 mM, 1 mM, 0.5 mM, 0.1 mM or 0.01 mM 6-oxo-1,4,5,6 tetrahydropyridazine-3-carboxylic acid at pH 5.7-5.8. The 0 mM 6-oxo-1,4,5,6-tetrahydropyridizine-3-carboxylic acid seeds were imbibed in aqueous solution containing only the soft soap and glycerol. The plants were allowed to grow to Zadoks GS13 (FIG. 1) when water was withheld until plants in all of the treatments had wilted leaves.

TABLE 6

| | 6-oxo-1,4,5,6-tetrahydropyridazine-3-carboxylic acid concentration in treatment solutions | | | |
|---|---|---|---|---|
| Drought stress | 0 mM | 1 mM | 0.5 mM | 0.1 mM |
| Wilted leaves | 40 | 19 | 14 | 18 |
| Total leaves | 47 | 57 | 64 | 61 |
| % Wilted leaves | 85% | 33% | 22% | 30% |

Example 17

Wheat seedlings were given foliar treatments with a range of concentrations of 6-oxo-1,4,5,6 tetrahydropyridazine-3-carboxylic acid and the seedlings were grown to near maturity and drought stressed. Their relative water contents were determined to examine the effectiveness of different concentrations of 6-oxo-1,4,5,6-tetrahydropyridizine-3-carboxylic acid in conferring drought resistance.

Sets of wheat (Var. VitPro) seedlings were given foliar treatments of 6-oxo-1,4,5,6 tetrahydropyridazine-3-carboxylic acid at concentrations of 1 mM or 0.1 mM in aqueous solutions. Two treatments were made; one at Zaddok GS 12(FIG. 1) and a second at Zadoks GS 14 (FIG. 1) and the plants grown until the first flag leaf was fully developed on the control plants. The treated plants and one set of controls were then drought stressed and the relative water content was determined for each set of plants. There were two sets of control plants; one was maintained with normal watering and a second control was drought stressed along with the treated plants. When each of the plants had at least two wilted leaves the water content of the drought stressed plants was determined relative to that of the normal, well-watered control plants. The flag leaves were harvested and used to determine the relative water content. The untreated, drought stressed control plants retained only 35.8%,the drought stress plants treated with 0.1 mM 6-oxo-1,4,5,6 tetrahydropyridazine-3-carboxylic acid retained 67.7% and the plants treated with 1 mM 6-oxo-1,4,5,66-tetrahydropyridazine-3-carboxylic acid retained 68.3% of the water content of the normally watered plants.

Example 18

Sets of wheat seedlings were given two foliar treatments with 6-oxo-1,4,5,6-tetrahydropyridazine-3-carboxylic acid to examine seedling recovery from drought stress.

Sets of wheat seedlings were given foliar treatments of 6-oxo-1,4,5,6-tetrahydropyridazine-3-carboxylic acid at concentration of 0.1 mM. Seedlings were given two foliar treatments: the first at Zadoks GS 12 and at Zadoks GS 14 (FIG. 1). The plants were grown in a greenhouse and fed a standard plant nutrient solution. The plants were drought stressed for 10 days after which water and nutrients were resumed and the plants were allowed to grow for 16 days.

TABLE 7

| Plant Parameter | 6-oxo-1,4,5,6-tetrahydropyridazinetetrahydropyridizin-3-carboxylic acid concentration in treatment solution and water available | | |
|---|---|---|---|
| | 0.0 Normal water | 0.0 Drought stressed | 0.01 mM Drought stressed |
| Total foliar fresh wt., avg., g | 32.3 | 28.2 | 33.4 |
| Number of seed heads, avg. | 5.4 | 7.1 | 8.3 |

Example 19

Soybean seed were treated with 6-oxo-1,4,5,6 tetrahydropyridazine-3-carboxylic acid to examine the effect on root nodulation by a nitrogen fixing bacterium.

Soybean seeds, cv. Viking, were treated with 6-oxo-1,4,5,6 tetrahydropyridazine-3-carboxylic acid (0.1 mM) and the resulting seedlings were grown in a greenhouse at 75° F. under natural light during a winter season. The extent of root nodulation by *Bradyrhizobium japonicum*, a nitrogen fixing bacterium was determined 4 weeks after planting. Plants from the untreated seeds averaged 655.8 mg of nodules per plant versus 763.7 mg for the plants from treated seeds.

What is claimed is:

1. A method for improving plant performance, comprising applying at least one compound selected from the group consisting of 6-oxo-1,4,5,6-tetrahydropyridazine-3-carboxylic acid and 6-oxo-1,4,5,6-tetrahydropyridazine-3-carboxylic salt to a plant to enable an increase in performance in the plant to include its harvestable yield over that of untreated plants.

2. The method of claim 1, wherein the harvestable yield includes at least one of:
weight and biomass of the foliar parts the plant over that for wild type plants;
weight or biomass of the roots of the plant over that for wild type plants;
seedling emergence of the plant over that for wild type plants;
yield of the plant over that for wild type plants;
agronomic performance of monocotyledonous and dicotyledonous plants over that for wild type plants;
drought resistance over that for wild type plants;
drought recovery over that for wild type plants;
germination and seedling emergence rate of plants in cool and warm germination temperatures over that for wild type plants and;
root nodulation with a nitrogen fixing bacterium.

3. The method of claim 2, wherein said increasing weight further comprises increasing at least one of the dry weight or the fresh weight.

4. The method of claim 2, wherein said increasing weight further comprises increasing the dry weight.

5. The method of claim 2, wherein said increasing weight further comprises increasing the fresh weight.

6. The method of claim 2, wherein the plant is contacted with the at least one compound in the form of at least one of a solution, suspension, powder, spray, coating or injection.

7. The method of claim 1, wherein the at least one compound is applied to the plant by at least one of foliar application or seed treatment form of at least one of a solution, suspension, powder, spray or coating.

8. A method for improving plant performance, comprising:
contacting a plant with at least one compound selected from the group consisting of 1-methyl-6-oxo-1,4,5,6-tetrahydropyridazine-3-carboxylic acid and 1-methyl-6-oxo-1,4,5,6-tetrahydropyridazine-3-carboxylic salt to enable an increase in performance of the plant over that of untreated plants by increasing at least one of:
weight and biomass of the foliar parts the plant over that for wild type plants;
weight or biomass of the roots of the plant over that for wild type plants;
seedling emergence of the plant over that for wild type plants;
yield of the plant over that for wild type plants;
agronomic performance of monocotyledonous and dicotyledonous plants over that for wild type plants;
drought resistance over that for wild type plants;
drought recovery over that for wild type plants;
germination and seedling emergence rate of plants in cool and warm germination temperatures over that for wild type plants; and
root nodulation with a nitrogen fixing bacterium.

9. The method of claim 8, wherein said increasing weight further comprises increasing the dry weight.

10. The method of claim 8, wherein said increasing weight further comprises increasing the fresh weight.

11. The method of claim 8, wherein the plant is contacted with the at least one compound in the form of at least one of a solution, suspension, powder, spray, coating or injection.

12. A method for improving plant performance, comprising:
contacting a plant with at least one compound selected from the group consisting of 1-alkyl-6-oxo-1,4,5,6-tetrahydropyridazine-3-carboxylic acid and 1-alkyl-6-oxo-1,4,5,6-tetrahydropyridazine-3-carboxylic salt to enable an increase in performance of the plant over that of untreated plants by increasing at least one of:
weight and biomass of the foliar parts the plant over that for wild type plants;
weight or biomass of the roots of the plant over that for wild type plants;
seedling emergence of the plant over that for wild type plants;
yield of the plant over that for wild type plants;
agronomic performance of monocotyledonous and dicotyledonous plants over that for wild type plants;
drought resistance over that for wild type plants;
drought recovery over that for wild type plants;

germination and seedling emergence rate of plants in cool and warm germination temperatures over that for wild type plants; and root nodulation with a nitrogen fixing bacterium.

13. The method of claim 12, wherein said increasing weight further comprises increasing the dry weight.

14. The method of claim 12, wherein said increasing weight further comprises increasing the fresh weight.

15. The method of claim 12, wherein the plant is contacted with the at least one compound in the form of at least one of a solution, suspension, powder, spray, coating or injection.

* * * * *